(12) United States Patent
Tang et al.

(10) Patent No.: US 12,218,870 B2
(45) Date of Patent: Feb. 4, 2025

(54) INFORMATION FEEDBACK METHOD AND APPARATUS, COMPUTER STORAGE MEDIUM

(71) Applicant: GUANGDONG OPPO MOBILE TELECOMMUNICATIONS CORP., LTD., Guangdong (CN)

(72) Inventors: Hai Tang, Guangdong (CN); Huei-Ming Lin, South Yarra (AU)

(73) Assignee: GUANGDONG OPPO TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/138,039

(22) Filed: Apr. 22, 2023

(65) Prior Publication Data
US 2023/0261822 A1 Aug. 17, 2023

Related U.S. Application Data

(63) Continuation of application No. 16/914,249, filed on Jun. 26, 2020, now Pat. No. 11,677,523, which is a continuation of application No. PCT/CN2017/119138, filed on Dec. 27, 2017.

(51) Int. Cl.
*H03D 3/22* (2006.01)
*H04B 7/0417* (2017.01)
*H04L 5/00* (2006.01)

(52) U.S. Cl.
CPC ......... *H04L 5/0048* (2013.01); *H04B 7/0417* (2013.01)

(58) Field of Classification Search
CPC .............................. H04L 5/0048; H04B 7/0417
USPC .................................. 375/329, 219, 295, 316
See application file for complete search history.

(56) References Cited

U.S. PATENT DOCUMENTS

| | | | |
|---|---|---|---|
| 2013/0156120 A1 | 6/2013 | Josiam et al. | |
| 2016/0134352 A1 | 5/2016 | Stirling-Gallacher | |
| 2018/0123848 A1* | 5/2018 | Nammi | H04L 27/2646 |
| 2020/0044779 A1* | 2/2020 | Ma | H04W 52/325 |

FOREIGN PATENT DOCUMENTS

CN 107148790 A 9/2017

OTHER PUBLICATIONS

The first office action and search report of corresponding CN application No. 2017800980139, dated Nov. 26, 2024, with search report.

(Continued)

*Primary Examiner* — Zewdu A Kassa
(74) *Attorney, Agent, or Firm* — Ladas & Parry, LLP

(57) ABSTRACT

The present disclosure discloses an information feedback method, an apparatus and a storage medium. The method includes: receiving, by a first terminal, N groups of reference signals sent by a second terminal, N being a positive integer, where transmission resources of the reference signals of different groups are in a pattern of time division; selecting, by the first terminal, a target reference signal based on the received N groups of reference signals; and sending, by the first terminal, index information of the target reference signal to the second terminal, where the index information is carried in a feedback channel.

20 Claims, 4 Drawing Sheets

---

A second terminal sends N groups of reference signals to a first terminal, N being a positive integer, where transmission resources of the reference signals of different groups are in a pattern of time division — 401

The second terminal receives index information of a target reference signal sent by the first terminal, where the index information is carried in a feedback channel — 402

(56) References Cited

OTHER PUBLICATIONS

Qualcomm Incorporated, "CSI feedback performance requirements for EB/FD-MIMO", R4-160044, 3GPP TSG-RAN WG4 #78, Malta, Feb. 15-19, 2016.
Wu Min, Shen Chao, Qiu Zhengding, "Neighborhood-based limited feedback approach in MIMO systems", Systems Engineering and Electronics, vol. 32, No. 7, Jul. 15, 2010, 4 pages.

* cited by examiner

INFORMATION FEEDBACK METHOD AND APPARATUS, COMPUTER STORAGE MEDIUM

CROSS-REFERENCE TO RELATED APPLICATIONS

This application is a continuation of U.S. patent application Ser. No. 16/914,249, filed on Jun. 26, 2020, which is a continuation of International Application No. PCT/CN2017/119138, filed on Dec. 27, 2017. All of the afore-mentioned patent applications are hereby incorporated by reference in their entireties.

TECHNICAL FIELD

The present disclosure relates to the field of wireless communication technologies and, in particular, relates to an information feedback method, an apparatus and a computer storage medium.

BACKGROUND

Vehicle-to-everything systems adopt a sidelink (SL, Sidelink) transmission technology based on long term evolution (LTE, Long Term Evolution)-device to device (D2D, Device to Device). Different from the manner of receiving or sending communication data through a base station in traditional LTE systems, the vehicle-to-everything systems adopt the manner of terminal-to-terminal direct communication, and thus have higher spectrum efficiency and lower transmission delay.

In 3GPP Rel-14, the vehicle-to-everything (V2X, Vehicle-to-Everything) technology is standardized, and two transmission modes are defined: a mode 3 and a mode 4. In the mode 3, transmission sources of the terminal are allocated by the base station. In the mode 4, the terminal determines the transmission sources by means of sensing+reservation.

In NR-V2X, an autonomous driving needs to be supported, so it puts forward higher requirements for data interaction between vehicles, such as higher throughput, lower delay, higher reliability, greater coverage, more flexible resource allocation and the like. In order to meet above requirements, a multi-antenna transmission technology needs to be introduced in NR-V2X, and in the multi-antenna transmission technology, how the sending end selects the optimal beam from multiple candidate beams is determined based on an index value of the optimal beam which is fed back by the receiving end.

In addition, NR-V2X needs to support various transmission methods, such as unicast, groupcast, and broadcast. In unicast transmission, the receiving end needs to feed back acknowledgement (ACK)/non-acknowledgement (NACK) information, channel quality indicator (CQI, Channel Quality Indicator) information, and the sending end can perform modulation and coding scheme (MCS, Modulation and Coding Scheme) adjustment and judge whether a re-transmission is needed according to the feedback information from the receiving end.

Based on this, how to design a feedback channel in NR-V2X to transmit feedback information is a problem that needs to be solved.

SUMMARY

In order to solve the above technical problem, embodiments of the present disclosure provide an information feedback method, an apparatus and a computer storage medium.

An embodiment of the present disclosure provides an information feedback method, including:

receiving, by a first terminal, N groups of reference signals sent by a second terminal, N being a positive integer, where transmission resources of the reference signals of different groups are in a pattern of time division;

selecting, by the first terminal, a target reference signal based on the received N groups of reference signals; and sending, by the first terminal, index information of the target reference signal to the second terminal, where the index information is carried in a feedback channel.

In the embodiment of the present disclosure, a value of N is indicated based on a control channel of the second terminal; or, a value of N is determined based on a pre-configuration; or, a value of N is determined based on a configuration by a base station.

In the embodiment of the present disclosure, each group of reference signal includes M time domain symbols, M being a positive integer; where, a value of M is indicated based on a control channel of the second terminal; or, a value of M is determined based on a pre-configuration; or, a value of M is determined based on a configuration by a base station.

In the embodiment of the present disclosure, a transmission resource of the control channel of the second terminal and the transmission resources of the reference signals are in a pattern of time division.

In the embodiment of the present disclosure, the control channel of the second terminal is transmitted without using beamforming.

In the embodiment of the present disclosure, the reference signals of the second terminal are transmitted using beamforming.

In the embodiment of the present disclosure, the feedback channel further includes at least one of the following: identification information of the first terminal, identification information of the second terminal.

In the embodiment of the present disclosure, the feedback channel includes K time domain symbols, K being a positive integer; where, a value of K is indicated based on a control channel of the first terminal; or, a value of K is determined based on a pre-configuration; or, a value of K is determined based on a configuration by a base station.

In the embodiment of the present disclosure, the sending, by the first terminal, index information of the target reference signal to the second terminal includes:

sending, by the first terminal, the feedback channel to the second terminal N times to transmit the index information of the target reference signal N times.

In the embodiment of the present disclosure, the method further includes:

performing, by the first terminal, sensing to determine at least one available resource, and selecting a transmission resource for transmitting the feedback channel from the at least one available resource.

In the embodiment of the present disclosure, the transmission resource of the feedback channel is indicated by a control channel of the first terminal.

In the embodiment of the present disclosure, the method further includes:

determining, by the first terminal, a transmission resource for transmitting the feedback channel based on the transmission resources of the reference signals.

In the embodiment of the present disclosure, a transmission resource of the control channel of the first terminal and the transmission resource of the feedback channel are in a pattern of time division.

An embodiment of the present disclosure provides an information feedback method, including:

sending, by a second terminal, N groups of reference signals to a first terminal, N being a positive integer, where transmission resources of the reference signals of different groups are in a pattern of time division; and receiving, by the second terminal, index information of a target reference signal sent by the first terminal, where the index information is carried in a feedback channel.

In the embodiment of the present disclosure, a value of N is indicated based on a control channel of the second terminal; or, a value of N is determined based on a pre-configuration; or, a value of N is determined based on a configuration by a base station.

In the embodiment of the present disclosure, each group of reference signal includes M time domain symbols, M being a positive integer; where, a value of M is indicated based on a control channel of the second terminal; or, a value of M is determined based on a pre-configuration; or, a value of M is determined based on a configuration by a base station.

In the embodiment of the present disclosure, a transmission resource of the control channel of the second terminal and the transmission resources of the reference signals are in a pattern of time division.

In the embodiment of the present disclosure, the control channel of the second terminal is transmitted without using beamforming.

In the embodiment of the present disclosure, the reference signals of the second terminal are transmitted using beamforming.

In the embodiment of the present disclosure, the feedback channel further includes at least one of the following: identification information of the first terminal, identification information of the second terminal.

In the embodiment of the present disclosure, the feedback channel includes K time domain symbols, K being a positive integer; where, a value of K is indicated based on a control channel of the first terminal; or, a value of K is determined based on a pre-configuration; or, a value of K is determined based on a configuration by a base station.

In the embodiment of the present disclosure, the receiving, by the second terminal, index information of a target reference signal sent by the first terminal includes:

receiving, by the second terminal, the feedback channel sent by the first terminal N times, where the feedback channel includes the index information.

In the embodiment of the present disclosure, the method further includes:

receiving, by the second terminal, control information from the first terminal, and determining a transmission resource for transmitting the feedback channel based on the control information from the first terminal.

In the embodiment of the present disclosure, the method further includes:

determining, by the second terminal, a transmission resource for transmitting the feedback channel based on the transmission resources of the reference signals.

An embodiment of the present disclosure provides an information feedback apparatus, which is applied to a first terminal and includes:

a receiving unit, configured to receive N groups of reference signals sent by a second terminal, N being a positive integer, where transmission resources of the reference signals of different groups are in a pattern of time division;

a selecting unit, configured to select a target reference signal based on the received N groups of reference signals; and a sending unit, configured to send index information of the target reference signal to the second terminal, where the index information is carried in a feedback channel.

In the embodiment of the present disclosure, a value of N is indicated based on a control channel of the second terminal; or, a value of N is determined based on a pre-configuration; or, a value of N is determined based on a configuration by a base station.

In the embodiment of the present disclosure, each group of reference signal includes M time domain symbols, M being a positive integer; where, a value of M is indicated based on a control channel of the second terminal; or, a value of M is determined based on a pre-configuration; or, a value of M is determined based on a configuration by a base station.

In the embodiment of the present disclosure, a transmission resource of the control channel of the second terminal and the transmission resources of the reference signals are in a pattern of time division.

In the embodiment of the present disclosure, the control channel of the second terminal is transmitted without using beamforming.

In the embodiment of the present disclosure, the reference signals of the second terminal are transmitted using beamforming.

In the embodiment of the present disclosure, the feedback channel further includes at least one of the following: identification information of the first terminal, identification information of the second terminal.

In the embodiment of the present disclosure, the feedback channel includes K time domain symbols, K being a positive integer; where, a value of K is indicated based on a control channel of the first terminal; or, a value of K is determined based on a pre-configuration; or, a value of K is determined based on a configuration by a base station.

In the embodiment of the present disclosure, the sending unit is configured to send the feedback channel to the second terminal N times to transmit the index information of the target reference signal N times.

In the embodiment of the present disclosure, the apparatus further includes:

a sensing unit, configured to perform sensing to determine at least one available resource, and select a transmission resource for transmitting the feedback channel from the at least one available resource.

In the embodiment of the present disclosure, the transmission resource of the feedback channel is indicated by a control channel of the first terminal.

In the embodiment of the present disclosure, the apparatus further includes:

a resource determining unit, configured to determine a transmission resource for transmitting the feedback channel based on the transmission resources of the reference signals.

In the embodiment of the present disclosure, a transmission resource of the control channel of the first terminal and a transmission resource of the feedback channel are in a pattern of time division.

An embodiment of the present disclosure provides an information feedback apparatus, which is applied to a second terminal and includes:

a sending unit, configured to send N groups of reference signals to a first terminal, N being a positive integer, where transmission resources of the reference signals of different groups are in a pattern of time division; and a receiving unit, configured to receive index information of the target reference signal sent by the first terminal, where the index information is carried in a feedback channel.

In the embodiment of the present disclosure, a value of N is indicated based on a control channel of the second terminal; or, a value of N is determined based on a pre-configuration; or, a value of N is determined based on a configuration by a base station.

In the embodiment of the present disclosure, each group of reference signal includes M time domain symbols, M being a positive integer; where, a value of M is indicated based on a control channel of the second terminal; or, a value of M is determined based on a pre-configuration; or, a value of M is determined based on a configuration by a base station.

In the embodiment of the present disclosure, a transmission resource of the control channel of the second terminal and the transmission resources of the reference signals are in a pattern of time division.

In the embodiment of the present disclosure, the control channel of the second terminal is transmitted without using beamforming.

In the embodiment of the present disclosure, the reference signals of the second terminal are transmitted using beamforming.

In the embodiment of the present disclosure, the feedback channel further includes at least one of the following: identification information of the first terminal, identification information of the second terminal.

In the embodiment of the present disclosure, the feedback channel includes K time domain symbols, K being a positive integer; where, a value of K is indicated based on a control channel of the first terminal; or, a value of K is determined based on a pre-configuration; or, a value of K is determined based on a configuration by a base station.

In the embodiment of the present disclosure, the receiving unit is configured to receive the feedback channel sent by the first terminal N times, where the feedback channel includes the index information.

In the embodiment of the present disclosure, the apparatus further includes: a determining unit, configured to receive control information from the first terminal, and determine a transmission resource for transmitting the feedback channel based on the control information from the first terminal.

In the embodiment of the present disclosure, the apparatus further includes: a determining unit, configured to determine a transmission resource for transmitting the feedback channel based on the transmission resources of the reference signals.

An embodiment of the present disclosure provides a computer storage medium, having computer executable instructions stored thereon, where the information feedback method described above is implemented when the computer executable instructions are executed by a processor.

In the technical solutions of the embodiments of the present disclosure, the first terminal receives N groups of reference signals sent by the second terminal, N being a positive integer, where the transmission resources of reference signals of different groups are in a pattern of time division; the first terminal selects the target reference signal based on the received N groups of reference signals; and the first terminal sends the index information of the target reference signal to the second terminal, where the index information is carried in the feedback channel. Using the technical solutions of the embodiments of the present disclosure, the second terminal sends N groups of reference signals in a manner of beam scanning, and the first terminal sends the index information of the target reference signal (that is, beam index information) to the second terminal through a newly designed feedback channel. In addition, the first terminal repeatedly sends the feedback channel N times, so that the receiving end can use N different beams to receive the index information, thereby ensuring the reception performance.

BRIEF DESCRIPTION OF THE DRAWINGS

The drawings illustrated here are used to provide a further understanding about the present disclosure and constitute a part of the present application. The schematic embodiments of the present disclosure and the description thereof are used to explain the present disclosure and do not constitute an improper limitation of the present disclosure. In the drawings.

DETAILED DESCRIPTION OF THE EMBODIMENTS

In order to understand the features and technical contents of embodiments of the present disclosure in more detail, the implementations of the embodiments of the present disclosure will be described in detail with reference to the drawings. The attached drawings are for reference and illustration only and are not intended to limit the embodiments of the present disclosure.

In order to facilitate the understanding of the technical solutions of the embodiments of the present disclosure, the mode 3 and the mode 4 in the vehicle-to-everything will be explained below.

Figure 1:
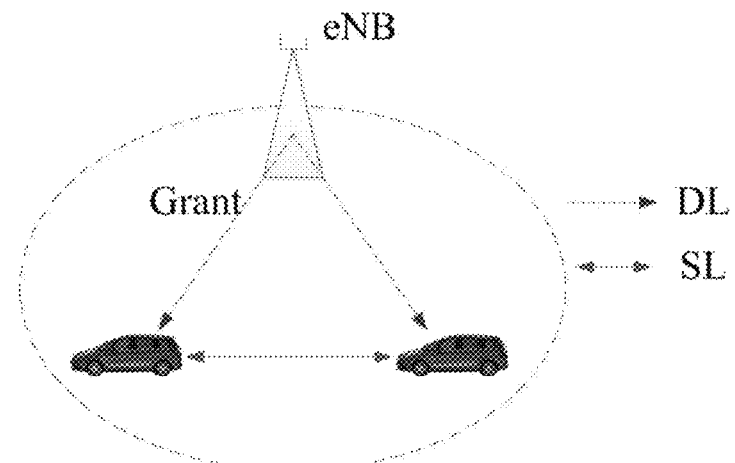
FIG. 1 is a schematic diagram of a scenario of a mode 3 in vehicle-to-everything.

Mode 3: as shown in FIG. 1, transmission resources of a vehicle terminal are allocated by a base station (such as an evolved NodeB (eNB, evolved NodeB) in LTE). Specifically, the base station sends a control message for indicating grant (Grant) resources to the vehicle terminal through down link (DL, Down Link); and then, the vehicle terminal sends data on SL according to the resources allocated by the base station. In the mode 3, the base station can allocate resources of single transmission for the vehicle terminal, or resources of semi-static transmission for the terminal.

Figure 2:
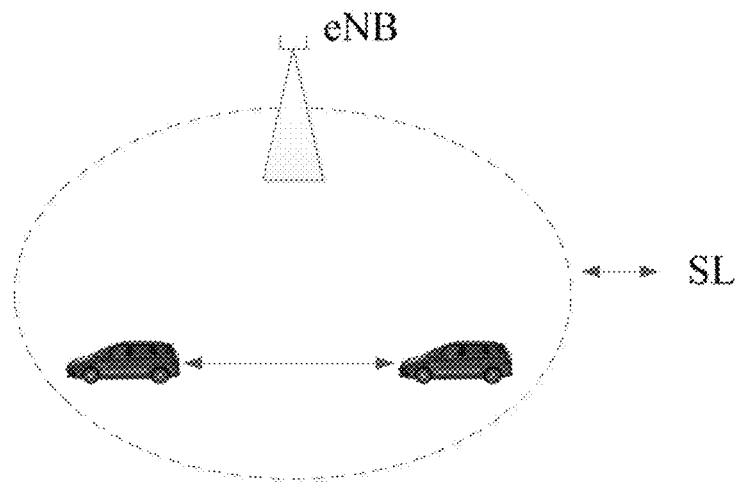
FIG. 2 is a schematic diagram of a scenario of a mode 4 in vehicle-to-everything.

Mode 4: as shown in FIG. 2, the vehicle terminal adopts a transmission mode of sensing+reservation. The vehicle terminal acquires an available transmission resource set by sensing in a resource pool, and the vehicle terminal randomly selects a resource from the transmission resource set for data transmission. Because services in a vehicle-to-everything system have a feature of periodicity, the vehicle terminal usually adopts a semi-static transmission mode, that is, after selecting a transmission resource, the vehicle terminal will continuously use the resource in multiple transmission periods, thereby reducing the probability of resource re-selection and resource conflict. The vehicle terminal will carry information about a resource reserved for the next transmission in control information of this transmission, so that other terminals can judge whether this resource is reserved and used by the vehicle terminal by detecting the control information of the vehicle terminal, realizing the purpose of reducing resource conflict.

It should be noted that in LTE-V2X, the mode 3 is used to represent that the transmission resources of the vehicle terminal are allocated by the base station, and the mode 4 is used to represent that the transmission resources of the vehicle terminal are independently selected by the terminal. In NR-V2X, a new transmission mode can be defined, which is not limited in the present disclosure.

The multi-antenna transmission technology needs to be introduced in NR-V2X, and multiple antennas can bring the following benefits:
1) Higher transmission rate: using the multi-antenna multiplexing transmission mode, multiple data streams can be transmitted on the same time-frequency resource, thereby increasing the transmission rate.
2) Greater coverage and higher reliability: using the beamforming technology, the energy can be concentrated in a very narrow beam, which improves the signal to interference plus noise ratio (SINR, Signal to Interference plus Noise Ratio) at the receiving end, thereby improving the reception success probability of the receiving end, or increasing the transmission distance.

Here, the coverage and reliability can be improved through beamforming, and how the sending end selects the optimal beam from multiple candidate beams can be realized through the following process: the sending end needs to perform beam scanning, and use different beams for transmission, respectively; the receiving end receives the data transmitted by respective beams, so that a beam with the best transmission quality can be selected as the optimal beam, and the index value of the beam is fed back to the sending end; in the subsequent data transmission, the sending end can use the optimal beam for data transmission.

In the above solution, the receiving end needs to feed the index value of the beam back to the sending end, and how to feed the beam information back in NR-V2X is a problem to be solved:
1) In the process of beam scanning, data transmission is performed using beamforming. If the beamforming is not used in the process of beam information feedback, it is difficult to ensure the transmission distance and reception performance.
2) If the beamforming is used in the transmission of feedback information, the terminal that sends the feedback information (that is, the sending end of the feedback information) acquires resources through competition, and how the terminal that receives the feedback information (that is, the receiving end of the feedback information) obtains the resources acquired by the sending end of the feedback information and adopts a suitable beam aligned to the sending end of the feedback information are all problems to be solved by the technical solutions of the embodiments of the present disclosure.

Figure 3:
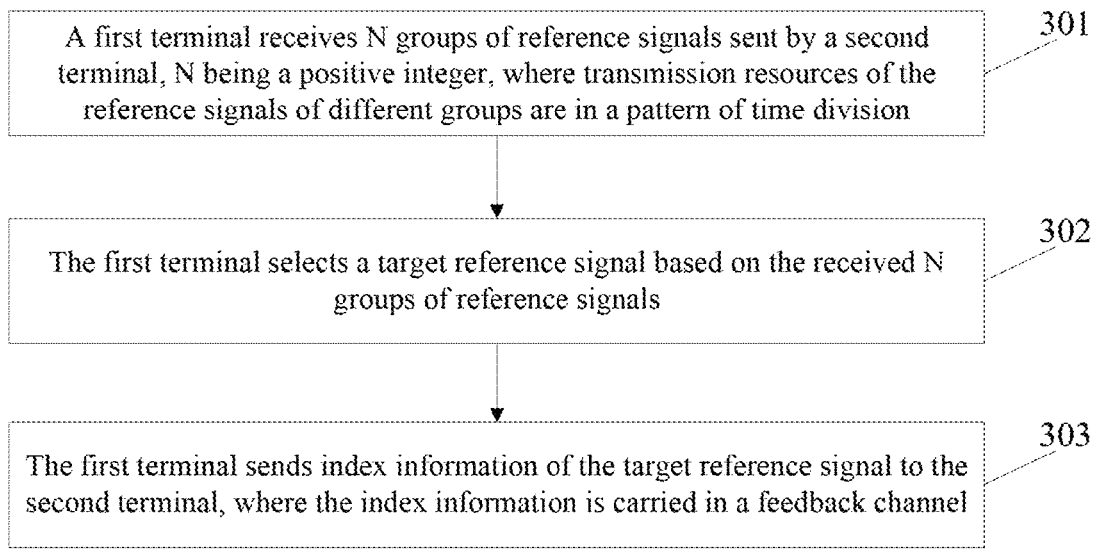
FIG. 3 is a schematic flowchart 1 of an information feedback method according to an embodiment of the present disclosure.

FIG. 3 is a schematic flowchart 1 of an information feedback method according to an embodiment of the present disclosure. As shown in FIG. 3, the information feedback method includes:

Step 301: a first terminal receives N groups of reference signals sent by a second terminal, N being a positive integer, where transmission resources of the reference signals of different groups are in a pattern of time division.

In the embodiment of the present disclosure, the type of the first terminal and the type of the second terminal are not limited, which could be devices like a vehicle terminal, a mobile phone, a notebook.

In the embodiment of the present disclosure, the second terminal sends data using beam scanning. The total number of beams of the second terminal is N, and the scanning for each beam occupies M data symbols (that is, each group of reference signal includes M time domain symbols, M being a positive integer), so N×M symbols are required to complete the beam scanning once. The first terminal receives the data sent through the beam scanning.

It should be noted that, unless otherwise stated, the symbol mentioned in the present disclosure refers to an orthogonal frequency division multiplexing (OFDM, Orthogonal Frequency Division Multiplexing) symbol.

It should be noted that, N is the total number of beams of the second terminal or the total number of beams to be scanned by the second terminal.

In the embodiment of the present disclosure, the total number N of beams of the second terminal can be determined through the following manners:
1) the value of N is indicated based on a control channel of the second terminal; or, 2) the value of N is determined based on a pre-configuration; or,
3) the value of N is determined based on a configuration by a base station.

In the embodiment of the present disclosure, the number M of symbols occupied by the scanning for each beam can be determined through the following manners:
1) the value of M is indicated based on the control channel of the second terminal; or,
2) the value of M is determined based on a pre-configuration; or,
3) the value of M is determined based on a configuration by the base station.

In an implementation, the transmission resource of the control channel of the second terminal and the transmission resources of the reference signals are in a pattern of time division. Further, the control channel of the second terminal is transmitted without using beamforming. The reference signals of the second terminal are transmitted using beamforming.

Here, the control channel and the data channel of the second terminal are transmitted in a time division multiplexing (TDM, Time Division Multiplexing) mode. This is because: if the control channel and the data channel of the second terminal are transmitted in a frequency division multiplexing (FDM, Frequency Division Multiplexing) mode, it is difficult to realize the transmission mode in which the control channel does not use the beamforming while the data channel uses the beamforming.

Step 302: the first terminal selects a target reference signal based on the received N groups of reference signals.

In an implementation, after receiving N groups of reference signals sent by the second terminal based on beam scanning, the first terminal select a reference signal with the best transmission quality from the N groups of reference signals (corresponding to N beams) as the optimal reference signal, that is, the target reference signal.

Step 303: the first terminal sends index information of the target reference signal to the second terminal, where the index information is carried in a feedback channel.

In the embodiment of the present disclosure, a new channel, i.e., a feedback channel for transmitting the index information of the target reference signal, is designed. In addition, the feedback channel can also be used to carry other feedback information, such as acknowledgement (ACK)/non-acknowledgement (NACK) information, channel quality indicator (CQI, Channel Quality Indicator) information, precoding matrix indicator (PMI, Precoding Matrix Indicator) information, rank indication (RI, Rank Indication) information, power indication information, etc.

In an implementation, the feedback channel further includes at least one of the following: identification information of the first terminal, identification information of the second terminal.

In the embodiment of the present disclosure, the feedback channel includes K time domain symbols, K being a positive integer; where the number K of symbols occupied by the feedback channel can be determined through following manners:
1) the value of K is indicated based on a control channel of the first terminal; or,
2) the value of K is determined based on a pre-configuration; or,
3) the value of K is determined based on a configuration by the base station.

In the embodiment of the present disclosure, the first terminal sends the feedback channel to the second terminal N times to transmit the index information of the target reference signal N times.

Here, each feedback channel occupies K symbols, so the total number of symbols occupied by the feedback channel is N×K, where N is the total number of beams of the second terminal.

In the embodiment of the present disclosure, the purpose of the first terminal sending the feedback channel to the second terminal N times is that: the second terminal utilizes N beams to align to the first terminal to receive N feedback channels using the beam scanning, where one beam corresponds to the reception of the feedback channel once.

In the embodiment of the present disclosure, the transmission resource of the feedback channel can be determined through the following manners:

Manner 1: the feedback resource of the first terminal is acquired by sensing.

Specifically, the first terminal performs sensing to determine at least one available resource, and selects a transmission resource for transmitting the feedback channel from the at least one available resource. Further, the transmission resource of the feedback channel is indicated by the control channel of the first terminal.

Manner 2: the feedback resource of the first terminal is determined by the transmission resource of the data sent by the second terminal.

Specifically, the first terminal determines the transmission resource for transmitting the feedback channel based on the transmission resources of the reference signals. For example: the transmission resource of the feedback channel can be determined by an index of the lowest physical resource block (PRB, Physical Resource Block) in which the data or the reference signals are located or an index of the lowest band in which the data or the reference signals are located.

In the above solution, the time domain length of the transmission resource of the feedback channel is N×K, here, each feedback channel occupies K symbols, and if the feedback channel is transmitted N times, the total number of symbols occupied by the feedback channel is N×K.

In the embodiment of the present disclosure, the control channel of the first terminal may be transmitted or not. If the first terminal does not transmit the control channel, the value of K and/or the transmission resource of the feedback channel is acquired at the second terminal side through a preset operation; for example, the second terminal acquires the value of K in a pre-configuration or in a configuration by the base station, the second terminal determines the transmission resource of the feedback channel through the transmission resources of the reference signals;

if the first terminal transmits the control channel, the value of K and/or the transmission resource of the feedback channel is acquired at the second terminal side through the control channel of the first terminal or acquired at the second terminal side through a preset operation; where the transmission resource of the control channel of the first terminal and the transmission resource of the feedback channel are in a pattern of time division.

Figure 4:
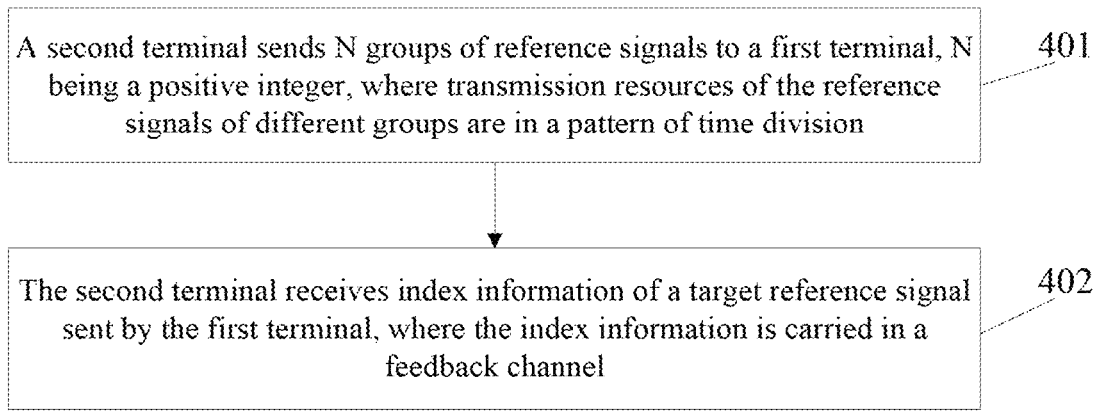
FIG. 4 is a schematic flowchart 2 of an information feedback method according to an embodiment of the present disclosure.

FIG. 4 is a schematic flowchart 2 of an information feedback method according to an embodiment of the present disclosure. As shown in FIG. 4, the information feedback method includes:

Step 401: a second terminal sends N groups of reference signals to a first terminal, N being a positive integer, where transmission resources of the reference signals of different groups are in a pattern of time division.

In the embodiment of the present disclosure, the second terminal sends data using beam scanning. The total number of beams of the second terminal is N, and the scanning of each beam occupies M data symbols (that is, each group of reference signal includes M time domain symbols, M being a positive integer), so N×M symbols are required to complete the beam scanning once. The first terminal receives the data sent through the beam scanning.

It should be noted that, N is the total number of beams of the second terminal or the total number of beams to be scanned by the second terminal.

In the embodiment of the present disclosure, the total number N of beams of the second terminal can be determined through the following manners:
1) the value of N is indicated based on a control channel of the second terminal; or,
2) the value of N is determined based on a pre-configuration; or,
3) the value of N is determined based on a configuration by a base station.

In the embodiment of the present disclosure, the number M of symbols occupied by the scanning of each beam can be determined through the following manners:
1) the value of M is indicated based on the control channel of the second terminal; or,
2) the value of M is determined based on a pre-configuration; or,
3) the value of M is determined based on a configuration by the base station.

In an implementation, the transmission resource of the control channel of the second terminal and the transmission resources of the reference signals are in a pattern of time division. Further, the control channel of the second terminal is transmitted without using beamforming. The reference signals of the second terminal are transmitted using beamforming.

Here, the control channel and the data channel of the second terminal are transmitted in a TDM manner. This is because: if the control channel and the data channel of the second terminal are transmitted in a FDM manner, it is difficult to realize the transmission mode in which the control channel does not use the beamforming while the data channel uses the beamforming.

Step 402: the second terminal receives index information of a target reference signal sent by the first terminal, where the index information is carried in a feedback channel.

In an implementation, the feedback channel further includes at least one of the following: identification information of the first terminal, identification information of the second terminal.

In the embodiment of the present disclosure, the feedback channel includes K time domain symbols, K being a positive integer; where the number K of symbols occupied by the feedback channel can be determined through following manners:
1) the value of K is indicated based on a control channel of the first terminal; or,
2) the value of K is determined based on a pre-configuration; or,
3) the value of K is determined based on a configuration by the base station.

In the embodiment of the present disclosure, the second terminal receives the feedback channel sent by the first terminal N times, where the feedback channel includes the index information. Further, the second terminal receives the feedback channel sent by the first terminal N times through N beams, where one beam corresponds to the reception of the feedback channel once.

In the embodiment of the present disclosure, the transmission resource of the feedback channel can be determined through the following manners:

Manner 1: the second terminal receives control information from the first terminal, and determines the transmission resource for transmitting the feedback channel based on the control information from the first terminal.

Manner 2: the second terminal determines the transmission resource for transmitting the feedback channel based on the transmission resources of the reference signals.

Specifically, the second terminal determines the transmission resource for transmitting the feedback channel based on the transmission resources of the reference signals. For example, the transmission resource of the feedback channel can be determined by an index of the lowest PRB in which the data or the reference signals are located or an index of the lowest band in which the data or the reference signals are located.

Figure 5:
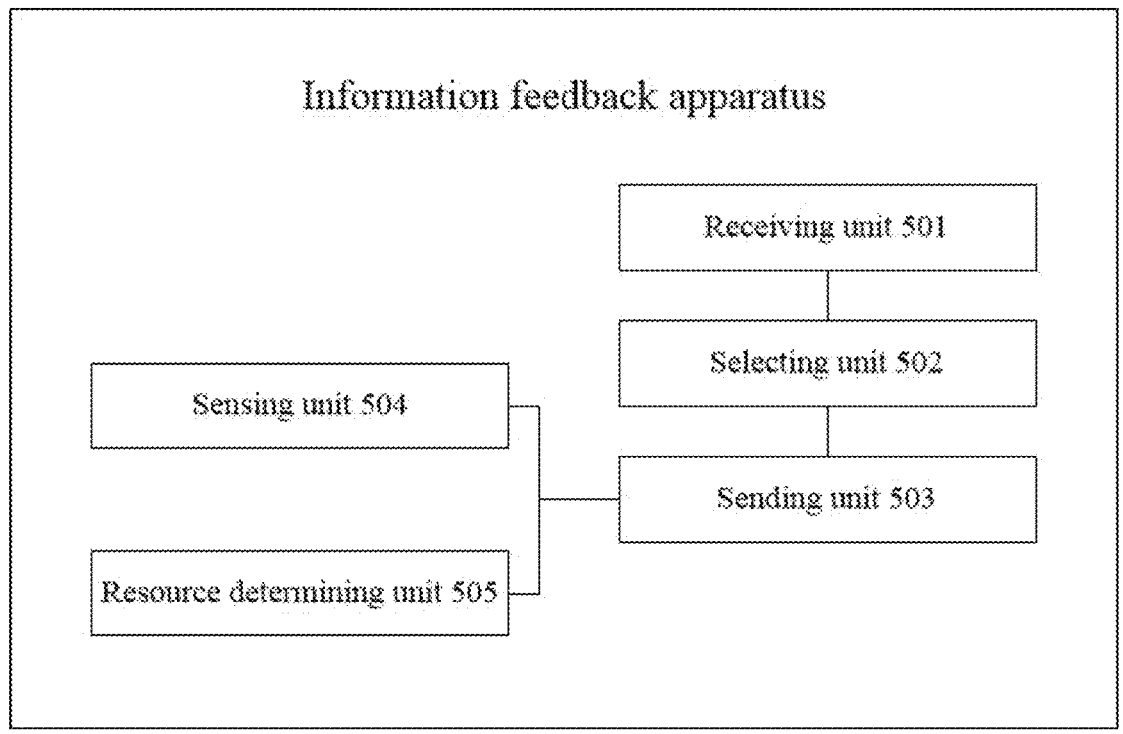
FIG. 5 is a schematic structural diagram 1 of an information feedback apparatus according to an embodiment of the present disclosure.

FIG. 5 is a schematic structural diagram 1 of an information feedback apparatus according to an embodiment of the present disclosure. The information feedback apparatus is applied to a first terminal. As shown in FIG. 5, the information feedback apparatus includes:
a receiving unit 501, configured to receive N groups of reference signals sent by a second terminal, N being a positive integer, where transmission resources of the reference signals of different groups are in a pattern of time division;
a selecting unit 502, configured to select a target reference signal based on the received N groups of reference signals; and
a sending unit 503, configured to send index information of the target reference signal to the second terminal, where the index information is carried in a feedback channel.

In an implementation, the value of N is indicated based on a control channel of the second terminal; or,
the value of N is determined based on a pre-configuration; or,
the value of N is determined based on a configuration by a base station.

In the embodiment of the present disclosure, the second terminal sends data using beam scanning. It should be noted that, N is the total number of beams of the second terminal or the total number of beams to be scanned by the second terminal.

In an implementation, each group of reference signal includes M time domain symbols, M being a positive integer; where,
the value of M is indicated based on the control channel of the second terminal; or,
the value of M is determined based on a pre-configuration; or,
the value of M is determined based on a configuration by the base station.

It should be noted that, unless otherwise stated, the symbol mentioned in the present disclosure refers to an OFDM symbol.

In an implementation, the transmission resource of the control channel of the second terminal and the transmission resources of the reference signals are in a pattern of time division.

In an implementation, the control channel of the second terminal is transmitted without using beamforming.

In an implementation, the reference signals of the second terminal are transmitted using beamforming.

In an implementation, the feedback channel further includes at least one of the following: identification information of the first terminal, identification information of the second terminal.

In an implementation, the feedback channel includes K time domain symbols, K being a positive integer; where,
the value of K is indicated based on a control channel of the first terminal; or,
the value of K is determined based on a pre-configuration; or,
the value of K is determined based on a configuration by the base station.

In an implementation, the sending unit 503 is configured to send the feedback channel to the second terminal N times to transmit the index information of the target reference signal N times.

In an implementation, the apparatus further includes:
a sensing unit 504, configured to perform sensing to determine at least one available resource, and select a transmission resource for transmitting the feedback channel from the at least one available resource.

In an implementation, the transmission resource of the feedback channel is indicated by the control channel of the first terminal.

In an implementation, the apparatus further includes:
a resource determining unit 505, configured to determine the transmission resource for transmitting the feedback channel based on the transmission resources of the reference signals.

In an implementation, the transmission resource of the control channel of the first terminal and the transmission resource of the feedback channel are in a pattern of time division.

Those skilled in the art should understand that, the functions implemented by the units in the information feedback apparatus shown in FIG. 5 can be understood with reference to relative description of the foregoing information feedback method. The functions of the units in the information feedback apparatus shown in FIG. 5 can be realized through a program running on a processor or through a specific logic circuit.

Figure 6:
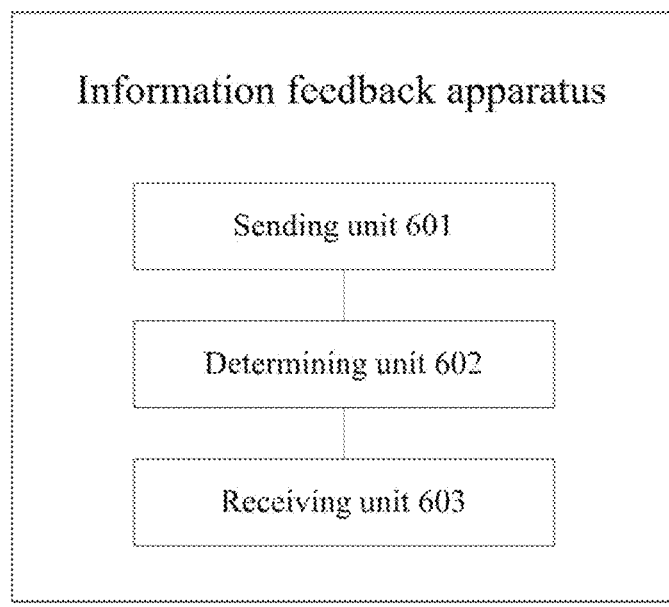
FIG. 6 is a schematic structural diagram 2 of an information feedback apparatus according to an embodiment of the present disclosure.

FIG. 6 is a schematic structural diagram 2 of an information feedback apparatus according to an embodiment of the present disclosure. The information feedback apparatus is applied to a second terminal. As shown in FIG. 6, the information feedback apparatus includes:
a sending unit 601, configured to send N groups of reference signals to a first terminal, N being a positive integer, where transmission resources of the reference signals of different groups are in a pattern of time division; and
a receiving unit 603, configured to receive index information of a target reference signal sent by the first terminal, where the index information is carried in a feedback channel.

In an implementation, the value of N is indicated based on a control channel of the second terminal; or,
the value of N is determined based on a pre-configuration; or,
the value of N is determined based on a configuration by a base station.

In the embodiment of the present disclosure, the second terminal sends data using beam scanning. It should be noted that, N is the total number of beams of the second terminal or the total number of beams to be scanned by the second terminal.

In an implementation, each group of reference signal includes M time domain symbols, M being a positive integer; where,
the value of M is indicated based on the control channel of the second terminal; or,
the value of M is determined based on a pre-configuration; or,
the value of M is determined based on a configuration by the base station.

It should be noted that, unless otherwise stated, the symbol mentioned in the present disclosure refers to an OFDM symbol.

In an implementation, the transmission resource of the control channel of the second terminal and the transmission resources of the reference signals are in a pattern of time division.

In an implementation, the control channel of the second terminal is transmitted without using beamforming.

In an implementation, the reference signals of the second terminal are transmitted using beamforming.

In an implementation, the feedback channel further includes at least one of the following: identification information of the first terminal, identification information of the second terminal.

In an implementation, the feedback channel includes K time domain symbols, K being a positive integer; where,
the value of K is indicated based on a control channel of the first terminal; or,
the value of K is determined based on a pre-configuration; or,
the value of K is determined based on a configuration by the base station.

In an implementation, the receiving unit 603 is configured to receive the feedback channel sent by the first terminal N times, where the feedback channel includes the index information.

In an implementation, the apparatus further includes: a determining unit 602, configured to receive control information from the first terminal, and determine a transmission resource for transmitting the feedback channel based on the control information from the first terminal.

In an implementation, the apparatus further includes: a determining unit 602, configured to determine the transmission resource for transmitting the feedback channel based on the transmission resources of the reference signals.

Those skilled in the art should understand that, the functions implemented by the units in the information feedback apparatus shown in FIG. 6 can be understood with reference to relative description of the foregoing information feedback method. The functions of the units in the information feedback apparatus shown in FIG. 6 can be realized through a program running on a processor or through a specific logic circuit.

The above technical solutions of the embodiments of the present disclosure are applicable to not only the vehicle-to-everything system, but also other end-to-end communication systems. The terminal in the embodiments of the present disclosure may be a vehicle terminal, a handheld terminal, a personal digital assistant (PDA, Personal Digital Assistant), a wearable terminal, etc.

The above information feedback apparatus in the embodiments of the present disclosure may also be stored in a computer-readable storage medium when implemented in the form of software functional modules and sold or used as an independent product. Based on such understanding, the essence, or the part contributing to the prior art, of the technical solutions of the embodiments of the present disclosure can be embodied in the form of a software product The computer software product is stored in a storage medium and includes several instructions for making a computer device (which may be a personal computer, a server, or a network device, etc.) execute all or part of the methods described in various embodiments of the present disclosure. The foregoing storage medium includes various media that can store program codes, such as: a U disk, a mobile hard disk, a read only memory (ROM, Read Only Memory), a magnetic disk, or an optical disk. In this way, the embodiments of the present disclosure are not limited to any specific combination of hardware and software.

Correspondingly, an embodiment of the present disclosure further provides a computer storage medium, having computer executable instructions stored thereon, where the above information feedback method of the embodiments of the present disclosure is implemented when the computer executable instructions are executed by a processor.

Figure 7:
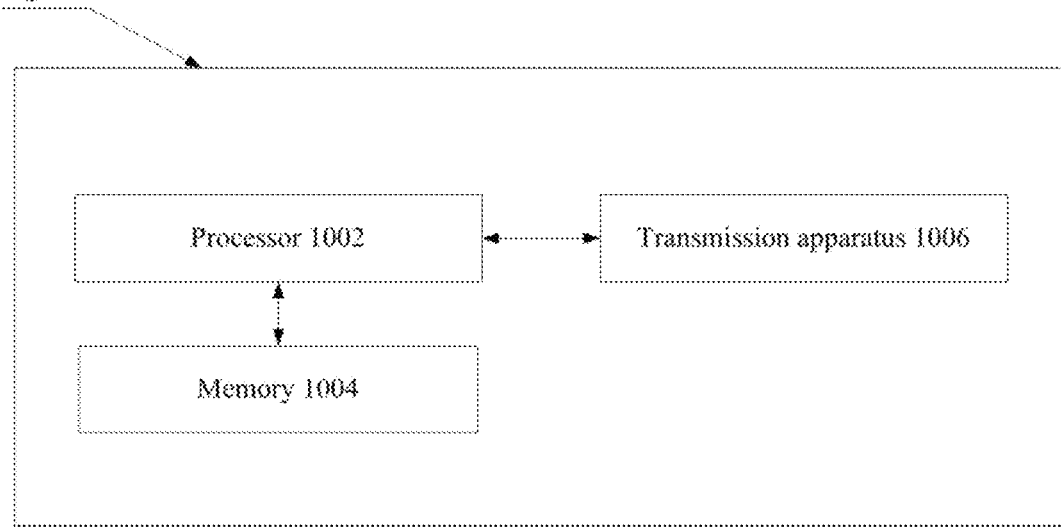
FIG. 7 is a schematic structural diagram of a computer device according to an embodiment of the present application.

FIG. 7 is a schematic structural diagram of a computer device according to an embodiment of the present disclosure. The computer device may be any type of terminal. As shown in FIG. 7, the computer device 100 can include one or more (only one shown in the figure) processors 1002 (the processor 1002 may include, but is not limited to, a processing apparatus such as a microprocessor, a micro controller unit (MCU), a programmable logic device or a field programmable gate array (FPGA), a memory 1004 for storing data, and a transmission apparatus 1006 for communication functions. Those skilled in the art can understand that the structure shown in FIG. 7 is only for illustration, and does not limit the structure of the above electronic apparatus. For example, the computer device 100 may further include more or less components than those shown in FIG. 7, or have a different configuration from that shown in FIG. 7.

The memory 1004 may be used to store software programs and modules of application software, such as program instructions/modules corresponding to the method in the embodiments of the present disclosure, and the processor 1002 executes the software programs and modules stored on the memory 1004, thereby executing various functional applications and data processing, that is, realizing the above method. The memory 1004 may include a high-speed random access memory, and may further include a non-volatile memory, such as one or more magnetic storage apparatuses, flash memories, or other non-volatile solid-state memories. In some examples, the memory 1004 may further include memories that are remotely disposed relative to the processor 1002, and these remote memories can be connected to the computer device 100 through a network. Examples of the above network include, but are not limited to, the Internet, an intranet, a local area network, a mobile communication network, and their combinations.

The transmission apparatus 1006 is used to receive or send data via a network. Specific examples of the above network may include a wireless network provided by a communication provider of the computer device 100. In an example, the transmission apparatus 1006 includes a network adapter or a network interface controller (NIC), which can be connected to other network devices through a base station so as to communicate with the Internet. In an example, the transmission apparatus 1006 may be a radio frequency (RF, Radio Frequency) module, which is used to communicate with the Internet wirelessly.

The technical solutions described in the embodiments of the present disclosure can be combined arbitrarily without conflict.

In several embodiments provided by the present disclosure, it should be understood that the disclosed methods and intelligent devices may be realized in other ways. The device embodiments described above are only illustrative. For example, the division of the units is only a logical function division, and in actual implementation, there may be other division manners. For instance, multiple units or components may be combined, or may be integrated into another system, or some features may be omitted or not executed. In addition, the coupling between the illustrated or discussed components, whether a direct coupling or communication connection may be an indirect coupling or communication connection via some interfaces, devices or units, and may be electrical, mechanical, or otherwise.

The units described above as separation components may be, or may not be physically separated, and the component displayed as a unit may be, or may not be a physical unit, that is, it may be located at one place or distributed to multiple network elements; part or all of the units may be selected according to the actual needs to achieve the purpose of the solutions of the embodiments.

In addition, various functional units in various embodiments of the present disclosure may be integrated into one second processing unit, or serve as one unit separately, or two or more units may be integrated into one unit; the integrated unit may be realized either in the form of hardware or in the form of hardware together with software functional units.

The above descriptions are only specific embodiments of the present disclosure, and the protection scope of the present disclosure is not limited thereto. Any one skilled in the art may easily think of variations or substitutions within the technical scope disclosed in the present disclosure, and these variations or substitutions shall fall within the protection scope of the present disclosure.

What is claimed is:

1. An information feedback method, comprising:
sending, by a second terminal, N groups of reference signals to a first terminal, N being a positive integer, wherein transmission resources of the reference signals of different groups are in a pattern of time division; and
receiving, by the second terminal, index information of a target reference signal sent by the first terminal, wherein the index information is carried in a feedback channel.

2. The method according to claim 1, wherein,
a value of N is indicated based on a control channel of the second terminal; or,
a value of N is determined based on a pre-configuration; or,
a value of N is determined based on a configuration by a base station.

3. The method according to claim 1, wherein each group of reference signal comprises M time domain symbols, M being a positive integer; wherein,
a value of M is indicated based on a control channel of the second terminal; or,
a value of M is determined based on a pre-configuration; or,
a value of M is determined based on a configuration by a base station.

4. The method according to claim 3, wherein a transmission resource of the control channel of the second terminal and the transmission resources of the reference signals are in a pattern of time division.

5. The method according to claim 1, wherein the feedback channel further comprises at least one of the following: identification information of the first terminal, identification information of the second terminal.

6. The method according to claim 1, wherein the feedback channel comprises K time domain symbols, K being a positive integer; wherein,
- a value of K is indicated based on a control channel of the first terminal; or,
- a value of K is determined based on a pre-configuration; or,
- a value of K is determined based on a configuration by a base station.

7. The method according to claim 1, wherein the receiving, by the second terminal, index information of the target reference signal sent by the first terminal comprises:
- receiving, by the second terminal, the feedback channel sent by the first terminal N times, wherein the feedback channel comprises the index information.

8. The method according to claim 1, further comprising:
- receiving, by the second terminal, control information from the first terminal, and determining a transmission resource for transmitting the feedback channel based on the control information from the first terminal.

9. The method according to claim 1, further comprising:
- determining, by the second terminal, a transmission resource for transmitting the feedback channel based on the transmission resources of the reference signals.

10. The method according to claim 6, wherein a transmission resource of the control channel of the first terminal and a transmission resource of the feedback channel are in a pattern of time division.

11. An information feedback apparatus, wherein the apparatus is applied to a second terminal and comprises one or more processors and a memory, wherein the memory stores software programs, and when the one or more processors execute the software programs, the one or more processors are configured to:
- send N groups of reference signals to a first terminal, N being a positive integer, wherein transmission resources of the reference signals of different groups are in a pattern of time division; and
- receive index information of a target reference signal sent by the first terminal, wherein the index information is carried in a feedback channel.

12. The apparatus according to claim 11, wherein,
- a value of N is indicated based on a control channel of the second terminal; or,
- a value of N is determined based on a pre-configuration; or,
- a value of N is determined based on a configuration by a base station.

13. The apparatus according to claim 11, wherein each group of reference signal comprises M time domain symbols, M being a positive integer; wherein,
- a value of M is indicated based on a control channel of the second terminal; or,
- a value of M is determined based on a pre-configuration; or,
- a value of M is determined based on a configuration by a base station.

14. The apparatus according to claim 13, wherein a transmission resource of the control channel of the second terminal and the transmission resources of the reference signals are in a pattern of time division.

15. The apparatus according to claim 11, wherein the feedback channel further comprises at least one of the following: identification information of the first terminal, identification information of the second terminal.

16. The apparatus according to claim 11, wherein the feedback channel comprises K time domain symbols, K being a positive integer; wherein,
- a value of K is indicated based on a control channel of the first terminal; or,
- a value of K is determined based on a pre-configuration; or,
- a value of K is determined based on a configuration by a base station.

17. The apparatus according to claim 11, wherein the one or more processors are configured to receive the feedback channel sent by the first terminal N times, wherein the feedback channel comprises the index information.

18. The apparatus according to claim 11, wherein the one or more processors are further configured to:
- receive control information from the first terminal, and determine a transmission resource for transmitting the feedback channel based on the control information from the first terminal.

19. The apparatus according to claim 11, wherein the one or more processors are further configured to:
- determine a transmission resource for transmitting the feedback channel based on the transmission resources of the reference signals.

20. The apparatus according to claim 16, wherein a transmission resource of the control channel of the first terminal and a transmission resource of the feedback channel are in a pattern of time division.

* * * * *